Sept. 17, 1940.  G. S. DAUPHINEE  2,214,737
AIR PURIFICATION
Filed Sept. 3, 1936  2 Sheets-Sheet 1

INVENTOR.
George S. Dauphinee
BY Moses & Nolte
ATTORNEYS

Sept. 17, 1940.   G. S. DAUPHINEE   2,214,737
AIR PURIFICATION
Filed Sept. 3, 1936   2 Sheets-Sheet 2
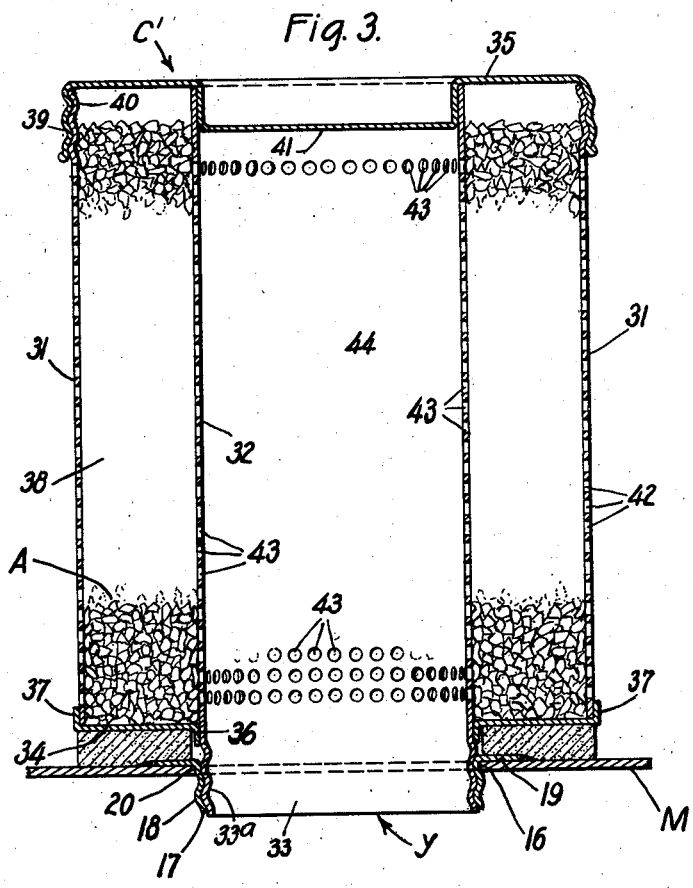
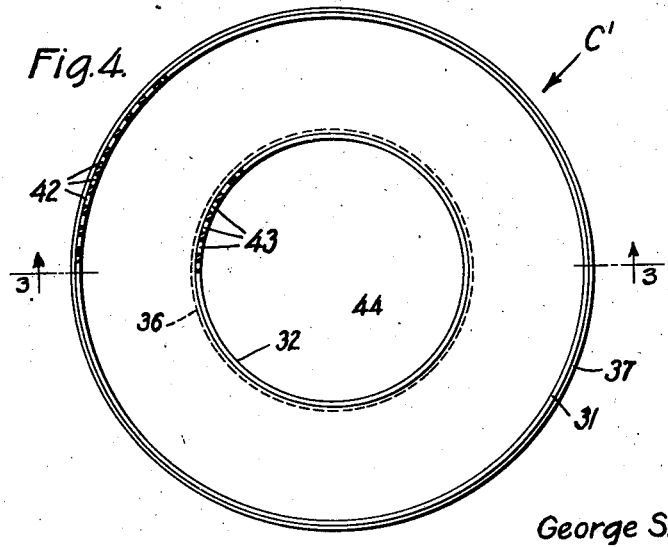
INVENTOR.
George S. Dauphinee.
BY
ATTORNEYS Patented Sept. 17, 1940

2,214,737

UNITED STATES PATENT OFFICE 2,214,737

AIR PURIFICATION

George S. Dauphinee, Brooklyn, N. Y., assignor, by mesne assignments, to W. B. Connor Engineering Corp., New York, N. Y., a corporation of New York Application September 3, 1936, Serial No. 99,233

1 Claim. (Cl. 183—49)

This invention relates to apparatus for the removal from air of extraneous gases and like adulterants, especially to devices for the above purpose which are of the nature of an adsorber, employing such adsorbent media as activated carbon, alumina or silica gel, and the invention is of particular utility for the purification of a re-circulated portion of air in an air-conditioning and air heating system, although the improvements herein disclosed may be used in any field for which they are adapted by their nature.

While the principle of such air purification by the use of activated carbon is well-known, designers are confronted at present with serious obstacles in its practical and commercial application to air conditioning service. Among these obstacles are, high first cost of construction, and requirements for the provision of space to an extent that must be large if consistent with reasonably low resistance to air flow, and this constitutes an important factor in operating cost. Another obstacle is the need for renewal of the carbon element after it has become saturated.

Heretofore, where conventional beds of activated carbon occupying a considerable area have been used, the renewal method has involved the renewal of the saturated carbon in bulk from the beds, which are then refilled with fresh carbon, the spent material being returned to a central depot for reactivation.

Owing to the disadvantages which are inherent in the removal and replacement of such reagents en masse, including the difficulty of attaining desirable uniformity in the disposition of the carbon, etc., it has been proposed to use an assembly of cells which heretofore have been of the flat type construction, with a relatively thick layer of carbon (4 inches to 6 inches thick), and a correspondingly high resistance to fluid flow. In the recovery of gases with such equipment, the bed must have considerable thickness to permit continuity of operation over reasonably long periods before re-activation becomes necessary. This is due to the fact that the gas concentration is high, in the class of recovery operations under discussion, and the value of this recovery justifies the expenditure of the power necessary to overcome bed resistances.

Per contra, for application to air-conditioning problems or to the abatement of odor nuisances, where the inclusions of gases or effluvia from which the odors emanate are invariably of low concentration, and as no direct money return exists, such as in the aforesaid recovery operation, cost of operation is of primary importance.

Under such conditions, an object of the present invention is to provide for application to such odor abatement installations, and in the solution of analogous problems, a bed of adsorbent material having a thickness of about one-half of an inch, and with a corresponding desirably low resistance, being permeable by an air stream having a flow velocity of about forty feet per minute. With such thickness and velocity the life of this bed, as applied to air conditioning, will be from two to three years before reactivation becomes necessary, and hence the use of thicker beds, with their resultant high resistance, is rendered unnecessary, being in fact impracticable for the intended use in odor abatement.

In order that the requirements which are desirably to be met in the provision of an economical and satisfactory odor abatement apparatus may be understood fully, it should be realized that to maintain the air of an occupied enclosure at a degree of purity of the order of 100% from the standpoint of freedom from odors is as impracticable commercially as to render it 100% dust-free.

If the condition in an occupied enclosure is such that odor is not detectable by the average sense of smell, on entering from the outside, then such condition satisfies fully the ventilating requirements from the odor standpoint. In the consideration of odor abatement as applied to the contamination of the air surrounding manufacturing establishments, for example, enforcement officers interpret the term "abatement" in its literal sense and do not insist upon absolute purity of the exit air from the process room or conditioner, realizing as they do that such a demand would be unreasonable and an unwarranted restraint upon the manufacturer.

In the solution of abatement problems heretofore, engineers have, however, permitted themselves to be guided solely by the practice and principles suited to the foregoing recovery problems, and as a consequence their conclusions have proved quite impractical from a commercial standpoint, and have seriously retarded the response to a real demand for a marketable apparatus in which the adsorption principle will be applied to the odor abatement problem.

Another object of the present invention then, is to provide an adsorption device employing a very thin bed, wherein absolute removal of odor from the aeroform flow therethrough is waived in the interest of low operating resistance, and the object is also to produce satisfactory odor removal without excessive and restrictive first cost and operating expense.

Indeed, after all factors have been properly assessed, it will be experienced in many cases that such a compromise is as desirable in general, as it is more particularly in the case of applications of the adsorber principle to the treatment of recirculated air for air conditioning, where the same air passes through the adsorber many times. Activated carbon will function to remove odors from impure air up to the point of its relative saturation when included in the impure airstream circuit of the apparatus, and the fact that activated carbon gradually loads itself to the saturation point with adsorbed impurities from used air is proof that under such conditions the air passing has been correspondingly and desirably cleared from its odorous impurities, even though there may not have been 100% removal of the impure gases in each pass through the adsorber.

In further pursuance of the present invention an object is to provide a novel type of multiple cell adsorber in which the thin bed is divided and subdivided into a multiplicity of cell units so combined with a plate or support of the nature of a manifold that maximum adsorbent bed area per unit area of plate manifold is provided.

A cognate object is to provide a simple plate manifold formed with a multiplicity of sockets spaced systematically to receive relatively small adsorbent cells or units.

Another, and complemental, object is to provide such a small adsorbent unit or cell that in filling ordinary anticipated requirements on the basis of cubic feet of air to be treated, a large number of these units will be required, and in production these may be duplicated in large multiples, with consequently low production cost, not only per cell, but ultimately a desirably low unit cost of adsorbent bed area for the entire assembly will be attained. A similar object is to devise a novel cell type of such small size, and such structure, that light tin plate may be used in their fabrication, which will be brought within the capacity of the ordinary small can making machinery.

Still another object of the invention is to provide a standard cell of practical size and proportions which may be assembled in multiple with the greatest flexibility in arrangement, being practical not only for small capacity installations where space is cramped and extreme compactness desirable, but also when used in groups, layers or tiers for large installations; and so disposed that in each assembly the novel type of unit will afford a most compact, inexpensive and reliable solution of the odor removal problem, by the adsorbent bed principle.

As a further development in utilization of the principle, it is an object of the invention to so combine the aforesaid cell-and-manifold assembly with an air-duct of suitable cross-section and construction that maximum adsorbent bed area will be provided per unit of cross-sectional duct or main-air-stream area consistent with the minimum resistance of the device to air flow.

An object of outstanding importance is to provide a device of the nature specified so constructed and arranged that the spent or inactive cells can be readily removed from the manifold and replaced by active cells. This permits the transfer of each cell as a unit, and of large quantities of the cells at the same time, to a reactivation depot for rejuvenation instead of following the conventional practice of removing the carbon from the adsorber units with resultant breaking and waste of carbon in handling. I further propose that the spent cell, complete with its charge of spent adsorbent material, be placed into a reactivating chamber on a manifold which may be the same as that used in the adsorber, or of a similar type, and there subjected to the action of steam at a suitable temperature, circulated therethrough to drive off the adsorbed gases.

Other objects and features of the invention will appear as the description of the particular physical embodiment selected to illustrate the invention progresses.

In the accompanying drawings, like characters of reference have been applied to corresponding parts throughout the several views making up the drawings, in which:

Fig. 3 is a fragmentary detail view on an enlarged scale in vertical, diametrical section, taken on the line 3—3 of Fig. 4, illustrating one of the adsorber cell units or components, as shown in Figs. 1 and 2, separately;

Fig. 4 is a plan view, partly in section and with the cover removed, of the adsorber cell or unit, as shown in Fig. 3.

Figure 1:
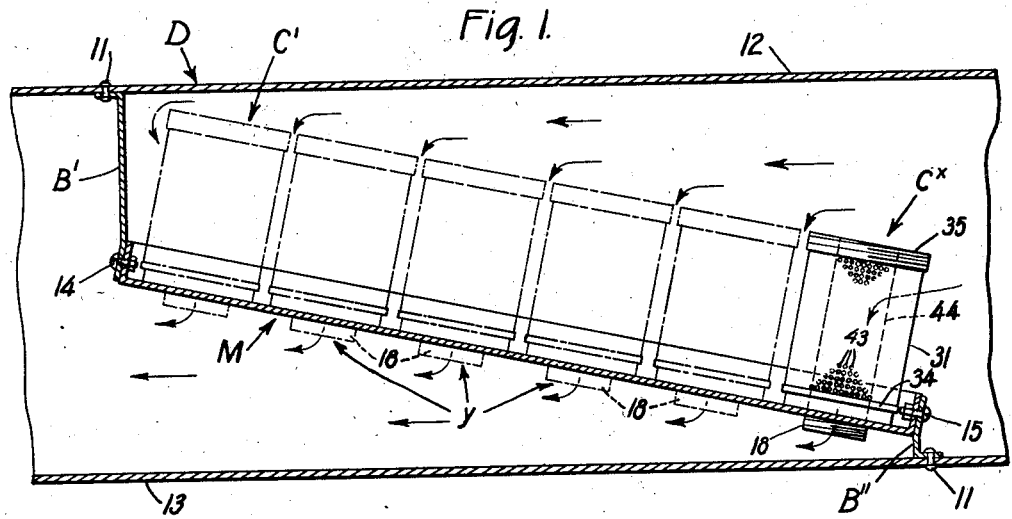
Fig. 1 is a view in sectional elevation of an adsorber device in the construction of which the present invention has been embodied.
Figure 2:
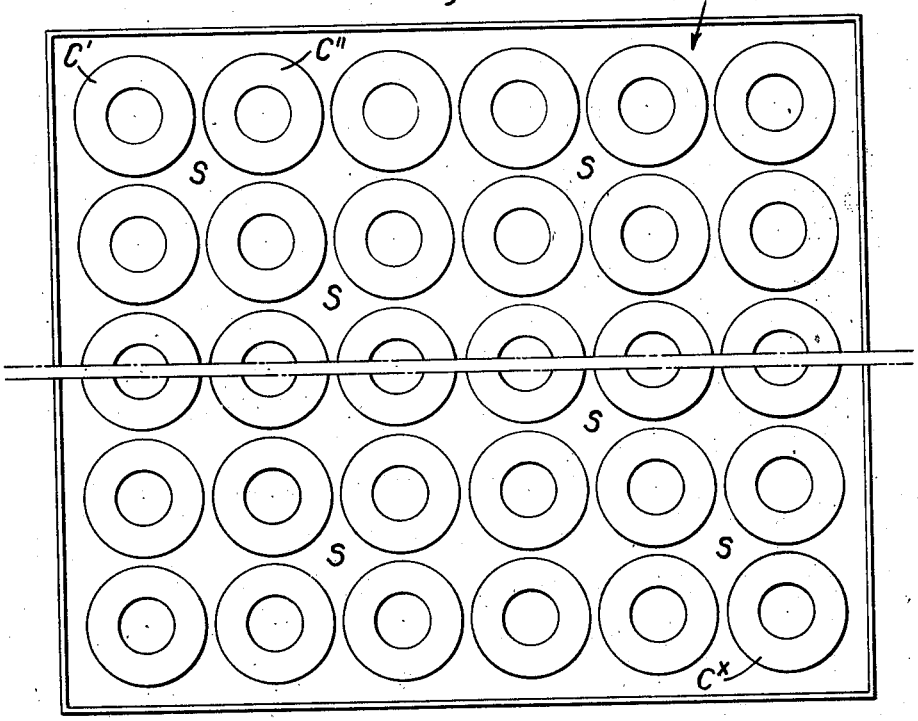
Fig. 2 is a plan view of a multiple cell assembly constituting an adsorber device, as shown in Fig. 1.

In a now-preferred embodiment of the invention selected for illustration and description, the part designated generally by the reference character C' is one of a series of adsorber units or cells which, in the assembly illustrated in Figs. 1 and 2, compose a complete adsorber device or apparatus, intended for use in the abatement of undesirable odors emanating from the bodies of occupants of an enclosure (not shown) which may, for example, be the auditorium of a theatre, the air of which is to be intercirculated and conditioned, by any suitable system, of which the duct D, illustrated in Figs. 1 and 2, may form a part.

Before proceeding to a description in detail of the preferred form of cell or adsorber unit, it will be noted that in carrying the invention into effect, an indefinite number of such cells, as C', C'', etc., to CX are designed to be mounted in assembled, systematic relation as indicated, upon a manifold M, which preferably takes the form of a plate of sheet metal, carried by brackets, as B', B'', secured, as by rivets 11, to the upper and lower, or other, walls, as 12 and 13, of the duct, extending entirely across the duct. Preferably this securement will be of a removable character, as by "stove-bolts" 14 and 15, so that the manifold plate M can, with its cells C'—Cx be removed bodily from the brackets B', B''.

In its preferred arrangement, it is mounted in an inclined position, as shown in Fig. 1, whereby the optimum area of effective adsorbent bed material is exposed to the aeroform current indicated by arrows, the entire flow passing through the adsorber device.

As shown in Fig. 3, each cell, as C', is preferably mounted in an aperture, as 16, of the manifold plate M, the latter having, in each such hole, a threaded socket member, which in the instance illustrated, takes the form of a nipple 17 of sheet metal, in which a thread 18 is pressed up, the nipple having a flange 19 overlying the marginal edge 20 of the plate surrounding each opening 16. Preferably these nipples 17 will be welded or otherwise metallically united to the plate, or expanded into the openings 16 so as to unite them permanently with the manifold plate.

While the structure of the individual cell or units C'—C× may vary from that shown herein, to meet the exigencies of particular installations, the illustrated structure is generally preferred, for reasons that will appear as the description proceeds.

I prefer to use a cell comprising as elements an outer shell 31 of 3¾" diameter and an inner shell 32 of 2¾" diameter which gives an active wall height of approximately 10", according to the equation hereinafter set forth. The cell has a capacity to handle 28.4 cubic feet of air and requires 1.14 lbs. of activated carbon of a density equivalent to 34 lbs. per cubic feet, or 40 lbs. of carbon per 1000 cubic feet of air handled by the device at a resistance of .170" wg. Such an embodiment of my device, having a capacity of handling 1000 cubic feet of air per minute, can be fitted into a duct of 20" x 20" cross section, and other capacities will be designed in proportion to the cross-sectional area to be served. The standard air filter unit, now universally used in air conditioning systems, has a face dimension of 20" x 20" and a maximum capacity of filtering 800 cubic feet of air per minute. Accordingly, my adsorbent device for handling equal volumes of air can be fitted into the same cross-sectional area.

Both of the shells 31 and 32 are preferably made of tin-plate, perforated as indicated at 42 and 43 respectively, and the inner shell is provided with an extension 33 of sheet metal which is formed with a thread 33a adapted to screw into one of the sockets 17. This threaded extension is preferably formed integrally with the shell 32, the walls being imperforate and the opening y being of suitable size.

The outer shell 31 is held in proper relation to the inner shell 32 by head members 34 and 35, the lower head having a downwardly turned annular flange 36, and an upwardly turned peripheral flange 37 which cooperate respectively with the inner and outer shells to define the annular cylindrical space 38 which is filled with granular adsorbent material A, such as activated carbon, alumina or silica gel. The head 34 is preferably secured metallically to both the inner shell 32 and the outer shell 31, as by soldering.

The head 35 may be formed as a conventional sheet metal cap having a threaded rim 39 to screw upon a threaded lip 40 of the outer shell 31, and a boss 41 to fit into, and close, the upper end of shell 32.

By this cell structure, the adsorbent material is maintained in each shell as a cylindrical "bed" which is shown as upright, illustratively, and through which the circumambient air of the current circulated in duct D flows from the outside inwardly and then downwardly through the central bore 44 of the shell and out through the lower discharge opening "y", or in reverse direction if desired.

While this small sized cell has a decided advantage from the standpoint of production cost per unit area of bed, it also admits of greater flexibility in arrangement to suit any space condition—and especially is this manifest in its application to air conditioning systems for railroad cars where space is at a premium, and the only available spaces are small and irregular in size. The table given below clearly shows the advantage of the small cell in respect to space requirements, this being particularly advantageous where these cells must be fitted into existing duct work.

The spacing of the cells on the manifold is such that the aggregate area of the spaces S between the tops of the cells (see Fig. 2) is equal to the aggregate area of the openings "y" (see Fig. 1). This provides for equal velocities at both these points. I have restricted this velocity to 720 feet per minute, as I have found that velocities greater than 720 feet per minute produce a detectable non-uniformity in the rate of air flow through the cell wall and further that if the inter cell area S, S is greater than the area at y—y, this non-uniformity is evident at lower velocities. I have further restricted the air velocity through the openings 42, 43 in the cell walls to 40 feet per minute for all around efficient operation, particularly on the basis of practical resistance to air flow and practical gas adsorbent efficiency. The above data applied to the cell design gives a ratio of bed area to inner cylinder cross sectional area of 18 to 1, and establishes the height of the cell as—

$$h = \frac{9\,(d - \tfrac{1}{2}'')^2}{2d}$$

$h$ = height of cell in inches
$d$ = mean dia. of wall in inches

Apart from the fact that the relatively small cell is advantageous from the standpoint of manufacturing cost as hereinbefore stated, a simple calculation will show that the total wall area provided per inch of cell height per unit area of manifold, other design factors being constant, will increase approximately as the square root of the number of cells used, on manifolds of equal area. To further illustrate the advantage of the small diameter cell I present the following tabulation:

| Bed thickness = ½" | Inside diameter of cell | | | | | | | | |
|---|---|---|---|---|---|---|---|---|---|
|  | 1½" | 2" | 2½" | 3" | 4" | 5" | 6" | 7" | 8" |
| Square inches of bed afforded per square inch of manifold area per inch height of bed | .94 | .77 | .65 | .56 | .44 | .361 | .306 | .276 | .234 |
| Square inches of bed afforded per cubic inch of space occupied by assembled cells on manifold | .94 | .77 | .65 | .56 | .44 | .361 | .306 | .276 | .234 |
| Practical height of bed $h = \frac{9\,(d-\tfrac{1}{2}'')^2}{2d}$ ........Inches | 5 | 7⅛ | 9½ | 11½ | 16 | 20¼ | 25 | 29½ | 34 |
| Air capacity per square foot area of duct at 40 feet velocity through bed, in cubic feet per minute | 400 | 383 | 368 | 352 | 321 | 230 | 260 | 230 | 200 |

It will be noted from the above table that the smaller diameter cell has a decided advantage from the standpoint of space economy in respect to area of bed and air capacity.

In the case of air conditioning, it is to be noted that the air treated by the adsorber is from the occupied enclosure. The air in such service has picked up odorous gases while traversing the room, yet the final concentration is below that termed "threshold." "Threshold" is a term applied to the lowest concentration of odorous gases in air that is perceptible to the sense of small of the ordinary individual. This concentration of odorous gases in the room air is of course maintained by the conventional removal system, as it is designed to maintain a balance between odor generation and removal below the threshold point. A bed of carbon sufficiently thick to remove 100% of the odorous gases from the air passing through it at a velocity of 40 lineal feet per minute would be about 3" thick and have a resistance to air flow, at this velocity, of about 1¼" water gauge. It is obvious that such resistances are impractical for air conditioning service.

Again, the amount of carbon would be possibly four or five times more than could be saturated by the adsorbed gases during the practical life of the bed, from the standpoint of its fouling with fine dust filtered from the air, even though this air had previously been passed through the practically efficient air filter. As an example, the ½" thick bed which we have found most practical for low concentration service, such as air conditioning, will function for three years or more on the basis of 24 hours per day operation before it would become saturated with condensed odors. Again in the case of nuisance abatement where the discharge of foul air is passed through the carbon, 100% removal is not necessary or justified, as removal to approximately the "threshold" concentration is entirely satisfactory.

If a bed of carbon were to be made up of one layer of irregular shaped particles, then of course there would be free passages through the bed, and possibly 30% to 40% of the odorous gas would pass through without actual physical contact with the adsorptive surfaces. Upon addition of successive layers of carbon to the bed, the removal would no doubt follow the law of geometrical progression, and if we assume that one layer will take out 50% of the odorous gases, the next layer will take out 50% of the remainder to infinity. Theoretically, without reckoning other characteristics of the carbon in relation to these odorous gases, the thickness of the bed would go to infinity before accomplishing a 100% removal.

However, the carbon apparently has specific attraction for the odorous gas inclusions, which is a force to be reckoned with in addition to the element of chance. Hence, it is found that layers of carbon particles sufficient to make up a thickness of 3" will function to remove 100% of these odorous gas inclusions at velocities around 40 feet per minute. It is quite obvious that a bed thickness or a number of granular layers can be adopted whereby any desired removal efficiency and resistance to air flow can be obtained, so that the delivered air will be at or below "threshold" concentration in respect to odorous gases. The thickness of such an open bed will vary in general in proportion to the odorous gas concentration. For light concentrations in air conditioning work, or in fact nuisance abatement, the ½" bed or one of even less thickness will provide air having a concentration of not more than 10% of "threshold" concentration.

From the foregoing, the desirability, and theoretical basis of the thin bed design herein disclosed will be evident, and also its practicability from a standpoint of satisfactory performance. Its relatively low resistance results in a low operating cost, and it requires a minimum amount of adsorptive material. It is well to keep in mind in this connection that the adsorptive material used in even a thin bed of ½" constitutes fully 75% of the cost of the cell, and if 1" thick, the adsorptive material will represent about 86% of the total cost, thereby increasing the cost of the cell 75%.

I have described what I believe to be the best embodiments of my invention. I do not wish, however, to be confined to the embodiments shown, but what I desire to cover by Letters Patent is set forth in the appended claim.

No claim is made herein to any method involving the utilization of the disclosed apparatus, nor to any comprehensive system in which the disclosed apparatus may be utilized. Such claims are included in my copending application, Serial No. 339,006, filed June 5, 1940, for Air purification, said copending application being a continuation in part of the present application.

I claim:

An apparatus for removing odorous gases from air comprising the combination of a duct, a partition plate disposed transversely therein, said plate having a multiplicity of openings, and a multiplicity of odorous gas adsorber units mounted on said plate, said units each comprising a double walled cannister, the space between said walls being closed at both ends, the central portion of the cannister being closed at one end and open at the other end, said open ends being in communication with said openings in the plate, said cannisters each having a filling of gas adsorbent material disposed in the space between the side walls and forming a relatively thin bed of odorous gas adsorbent material, the double side walls having a multiplicity of closely spaced apertures to permit the flow of air through said bed, the inner wall of each of said cannisters together with the corresponding opening in said plate constituting a passage leading to one side of said bed, and the space between the outer wall of the cannister and the adjacent cannisters constituting a passage leading to the other side of said bed, the aggregate area of the passages on one side of the beds being substantially equal to the aggregate area of the passages on the other side of the beds, thereby providing for a substantially uniform distribution of air flow through the beds.

GEORGE S. DAUPHINEE.